(12) United States Patent
Varga et al.

(10) Patent No.: US 9,277,382 B2
(45) Date of Patent: Mar. 1, 2016

(54) EMERGENCY SERVICE IN COMMUNICATION SYSTEM

(75) Inventors: Jozsef Varga, Nagydobsza (HU); Andras Szeman, Budapest (HU); Andras Pasztor, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 226 days.

(21) Appl. No.: 13/509,319

(22) PCT Filed: Oct. 4, 2010

(86) PCT No.: PCT/EP2010/064715
§ 371 (c)(1),
(2), (4) Date: May 11, 2012

(87) PCT Pub. No.: WO2011/057865
PCT Pub. Date: May 19, 2011

(65) Prior Publication Data
US 2012/0218920 A1     Aug. 30, 2012

(30) Foreign Application Priority Data

Nov. 16, 2009 (WO) ............... PCT/EP2009/065247

(51) Int. Cl.
| | |
|---|---|
| *H04M 11/00* | (2006.01) |
| *H04W 4/22* | (2009.01) |
| *H04W 76/00* | (2009.01) |
| *H04L 29/06* | (2006.01) |

(52) U.S. Cl.
CPC ............... *H04W 4/22* (2013.01); *H04W 76/007* (2013.01); *H04L 65/1016* (2013.01); *H04L 65/1069* (2013.01)

(58) Field of Classification Search
None
See application file for complete search history.

(56) References Cited

U.S. PATENT DOCUMENTS

| | | | |
|---|---|---|---|
| 2007/0149166 A1* | 6/2007 | Turcotte et al. | 455/404.1 |
| 2008/0227430 A1* | 9/2008 | Polk | 455/404.2 |
| 2008/0261557 A1 | 10/2008 | Sim | 455/404.2 |
| 2009/0103518 A1* | 4/2009 | Yu et al. | 370/352 |
| 2011/0224969 A1* | 9/2011 | Mulligan et al. | 704/2 |
| 2014/0003420 A1* | 1/2014 | Veenstra et al. | 370/352 |

FOREIGN PATENT DOCUMENTS

EP      1 981 257 A2     10/2008

OTHER PUBLICATIONS

Sollins, K., et al., "Functional Requirements for Uniform Resource Names", RFC-1737, Dec. 1994, 7 pgs.

(Continued)

*Primary Examiner* — Omar Ghowrwal
(74) *Attorney, Agent, or Firm* — Harrington & Smith

(57) ABSTRACT

The invention relates to an apparatus, method and a computer program product for establishing a request for a session by an application server, determining by an emergency related local service function that the session includes an emergency session, wherein the emergency related local service function is co-located at the application server, and, transmitting the request for the session to an emergency call state control function of the internet protocol multimedia subsystem based on the determination.

9 Claims, 8 Drawing Sheets

(56) References Cited

OTHER PUBLICATIONS

3GPP TS23.167 V9.4.0 (Mar. 2010), "3$^{rd}$ Generation Partnership Project; Technical Specification Group Services and System Aspects; IP Multimedia Subsystem (IMS) Emergency Sessions (Release 9)", 38 pgs.

3GPP TS23.237 V9.2.0 (Sep. 2009), "3$^{rd}$ Generation Partnership Project; Technical Specification Group Services and Architecture; IP Multimedia Subsystem (IMS) Service Continuity; Stage 2 (Release 9)", 88 pgs.

S2-092508, 3GPP TSG-SA2 Meeting #72, Hangzhou, China, Mar. 30-Apr. 3, 2009, "E-CSCF Enhanced to Support Triggering the AS for Anchoring", China Mobile, ZTE, Huawei, 5 pgs.

3GPP TS 24.229 V9.1.0 (Sep. 2009) Technical Specification,3rd Generation Partnership Project Technical Specification Group Core Network and Terminals;IP multimedia call control protocol based on Session Initiation Protocol (SIP) and Session Description Protocol (SDP); Stage 3 (Release 9), (623 pages).

* cited by examiner

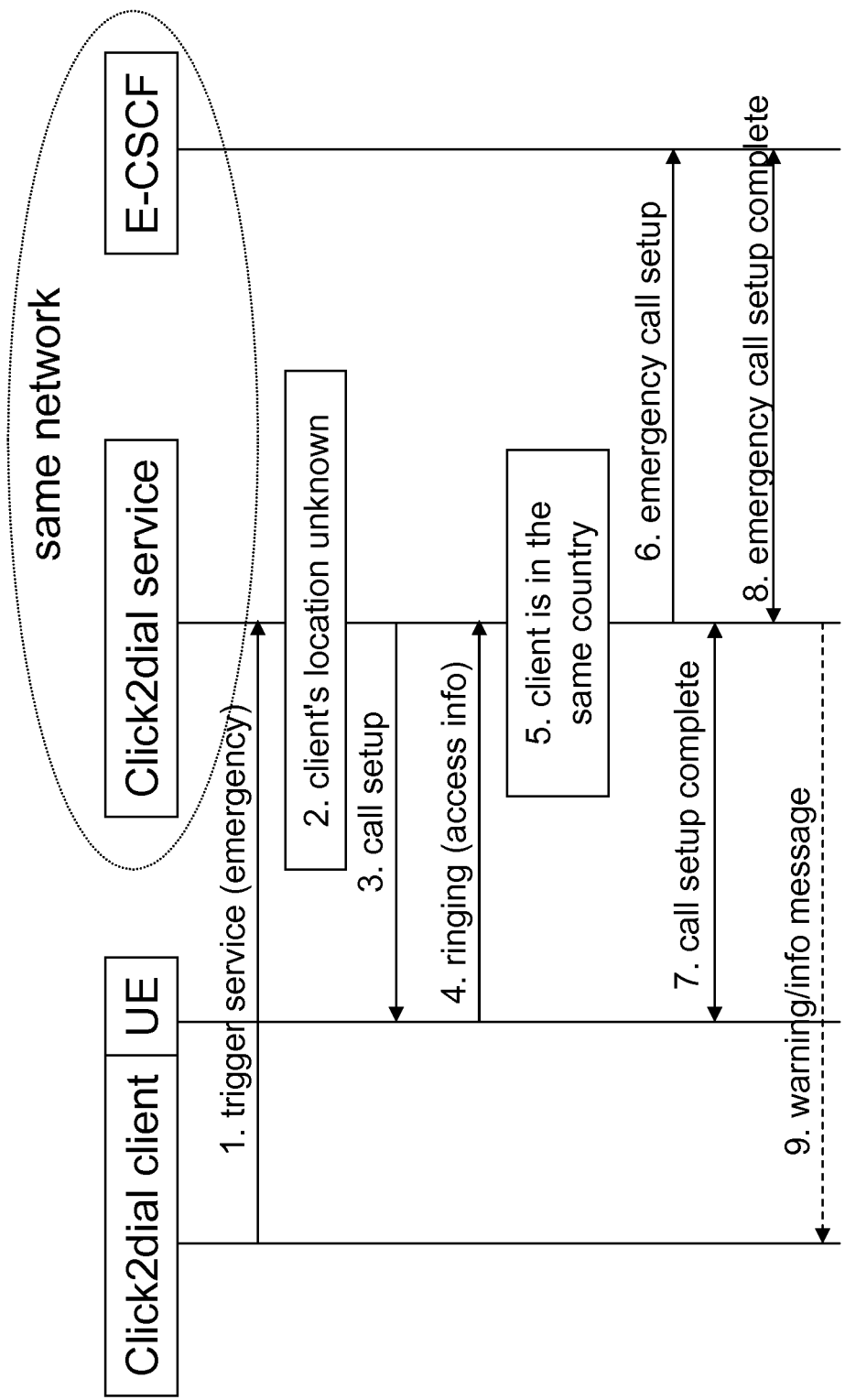

EMERGENCY SERVICE IN COMMUNICATION SYSTEM

TECHNICAL FIELD OF THE INVENTION

The present invention relates to a mechanism for processing requests for emergency services. In particular, the present invention is related to a method, apparatus and computer program for determining by an emergency related local service function that the session comprises an emergency session, wherein the emergency related local service function is co-located at an application server (AS).

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Session Description Protocol (SDP) is a protocol which conveys information about media streams in multimedia sessions to allow the recipients of a session description to participate in the session. The SDP offers and answers can be carried in SIP messages. Diameter protocol has been defined by IETF and is intended to provide an Authentication, Authorization and Accounting (AAA) framework for applications such as network access or IP mobility.

Generally, for properly establishing and handling a communication connection between network elements such as a user equipment and another communication equipment or user equipment, a database, a server, etc., one or more intermediate network elements such as control network elements, support nodes, service nodes and interworking elements are involved which may belong to different communication networks.

Emergency calls and emergency session shall receive special treatment in communication networks, meaning the phone calls for example to police or ambulance services are given priority over normal phone calls and can be routed to emergency center near caller if the location of the caller is known.

For the IMS emergency services, a proxy call state control function (P-CSCF) is responsible for detecting whether a received request is addressed to an emergency service. Because the emergency service is a visited network service, involvement of an S-CSCF located in the home network of the user should be avoided during routing the request to an emergency center.

SUMMARY OF THE INVENTION

The present invention overcomes the above problem by providing an entity, a method and a computer program product for handling an emergency service in a communication network, comprising establishing a request for a session by an application server (AS),
determining by an emergency related local service function that the session comprises an emergency session, wherein the emergency related local service function is co-located at the application server (AS), and,
transmitting the request for the session to an emergency call state control function (E-CSCF) of the internet protocol multimedia subsystem (IMS) based on the determination.

The application server (AS), the method and/or the computer program product can be configured to implement a click-to-dial service and can be configured to check, after determining that the session comprises an emergency session, whether the emergency session can be provided to a served user based on location information of the served user. The checking can include checking whether, based on the location information, the served user is located in a different country than the application server.

The application server (AS), the method and/or the computer program product can be configured to transmit a request to establish a call leg towards the served user, and the checking can comprise retrieving access related information of the served user from a response received to the request to establish the call leg towards the served user.

Further an entity, a method and a computer program product for handling an emergency service in a communication network are provided, comprising
receiving a request for a session by an emergency call state control function (E-CSCF),
determining that an application server (AS) is to be involved in handling of the request for the session,
transmitting the request for the session to the application server (AS), wherein the application server (AS) is configured to implement an emergency related local service function.

The application server (AS), the method and/or the computer program product can be configured to
providing, by the application server (AS), a service relating to the request for the session, and,
routing the request for the session by the application server (AS) to the emergency call state control function (E-CSCF) after providing the service.

The service can comprise calling address and/or called address manipulation for a virtual private network (VPN) service and/or providing a tone and/or an announcement to a calling subscriber.

The application server (AS) and the emergency call state control function (E-CSCF) are communication using I4 interface of the internet protocol multimedia subsystem (IMS).

Embodiment of the present invention may have one or more of following advantages:
Emergency requests can be kept out of the S-CSCF. Upon customer request visited network services can be applied for emergency service requests.
Operators can provide services (like announcements) for emergency requests.
Click-to-dial service can support emergency service without sending emergency requests to S-CSCF.

DESCRIPTION OF DRAWINGS

FIGS. 3-6 illustrate signaling flows relevant for aspects of the invention.

DETAILED DESCRIPTION OF THE INVENTION

Figure 1:
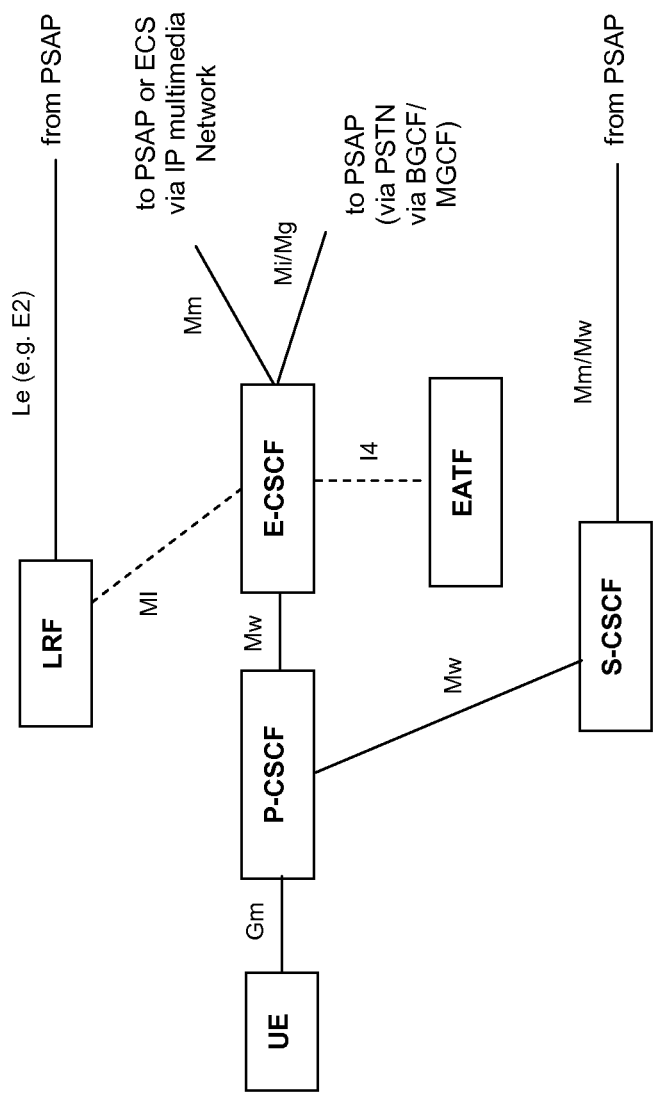
FIGS. 1, 2a and 2b illustrates network architectures relevant for aspects of the invention.

Different types of network entities and functions exist in the IMS network. Call Session Control Functions (CSCF)

implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing a SIP registration and routing SIP requests received from another network towards the S-CSCF. The S-CSCF can perform the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF can provide services to registered and unregistered users when it is assigned to these users. This assignment can be stored in the Home Subscriber Server (HSS).

An Application Server (AS) is offering value added IP multimedia (IM) services to users of the IMS network and can reside either in the IMS user's home network or in a third party location. The third party could be a network or simply a stand-alone AS. The AS may host and execute various services and can influence and impact a SIP session on behalf of the services. The IP multimedia Subsystem Service Control Interface (ISC) interface can be used between the S-CSCF and the service platforms (i.e. ASs). The ISC interface can offer extended services to subscribers. ASs that are connected to the IMS can be controlled via ISC interface. The protocol used on the ISC interface is the SIP.

A public safety answering point (PSAP) is a network element for emergency services that is responsible for answering emergency calls, such as a call center for answering calls to police, firefighting, and ambulance services. The PSAP can be capable of determining the location of a caller for landline calls and/or mobile phone locations, by utilizing the location information features specified for mobile networks.

The P-CSCF is responsible for detecting whether a request is destined for a PSAP. To achieve that, the P-CSCF can store a configurable list of local emergency service identifiers, i.e. emergency numbers and the emergency service URNs, which are valid for the operator to which the P-CSCF belongs to and a configurable list of roaming partners' emergency service identifiers and match the destination of the request to any one of the stored emergency service identifiers.

An Emergency CSCF (E-CSCF) can handle certain aspects of emergency sessions, e.g. routing of emergency requests to the correct emergency centre or PSAP.

A Routing Determination Function (RDF) is a functional entity, which may be integrated in a Location Server or in an LRF, and that can provide the proper PSAP destination address to the E-CSCF for routing the emergency request. It can interact with a LS to manage Emergency Service Query Key (ESQK) allocation and management, and deliver location information to the PSAP.

A Location Retrieval Function (LRF) is a functional entity that can handle retrieval of location information for the UE including, where required, interim location information, initial location information and updated location information. The LRF may interact with a separate RDF or contain an integrated RDF in order to obtain routing information. The LRF may interact with a separate Location Server or contain an integrated Location Server in order to obtain location information. The LRF may interact with or contain other types of location server functions in order to obtain location information.

Location information is needed for two main reasons in emergency services. The initial purpose of the location information is to enable the IMS network to determine which PSAP serves the area where the UE is currently located, so that the IMS network can route the emergency session to the correct PSAP. The second purpose is for the PSAP to get more accurate or updated location information for the terminal during or after the emergency session where required by local regulation.

A P-CSCF can handle registration requests with an emergency registration indication like any other registration request, except that it may reject an emergency registration request if the IMS that the P-CSCF belongs to can not support emergency sessions for the UE (e.g., due to local policy or UE is not within IMS's geographical area or IP-Connectivity Access Network (IP-CAN) not supported). The P-CSCF can select an Emergency CSCF in the same network to handle the emergency session request.

An E-CSCF can receive an emergency session establishment request from a P-CSCF. If location information is not included in the emergency request or additional location information is required, the E-CSCF may request the LRF to retrieve location information, for example, as described above (RDF and/or LRF). If required, the E-CSCF can request the LRF to validate the location information if included by the UE. The E-CSCF can determine or query the LRF for the proper routing information/PSAP destination and can route emergency session establishment requests to an appropriate destination including anonymous session establishment requests. Subject to national requirements, the E-CSCF may send the contents of the P-asserted-ID or UE identification to the LRF. Based on local policy, the E-CSCF may route the emergency IMS call to Emergency Call Server (ECS) for further call process. For supporting single radio voice call continuity (SRVCC), the E-CSCF can forward the session establishment request to the Emergency Access Transfer Function (EATF) in the serving IMS network for anchoring.

Location Retrieval Function (LRF) can be responsible for retrieving the location information of the UE that has initiated an IMS emergency session. It can be possible to support configurations where the Location Retrieval Function (LRF) may consist of a Routing Determination Function (RDF) and a Location Server (LS) connected to each others over an interface. The LRF can utilize the RDF to provide the routing information to the E-CSCF for routing the emergency request. The RDF can interact with a LS and manage ESQK allocation and management. The ESQK can be used by the PSAP to query the LRF for location information and optionally a callback number.

Information provided by the LRF to the E-CSCF can include the routing information and other parameters necessary for emergency services, which can be subject to local regulation. For example, this information may include the ESQK, ESRN, LRO in North America, location number in EU, PSAP SIP URI or TEL URI.

In order to provide the correct PSAP destination address to the E-CSCF, the LRF may require interim location information for the UE. In some regions, for example in the North American region, it may be a requirement to provide the PSAP with an accurate initial location estimate for the UE and possibly to provide an accurate updated location estimate for the UE if requested by the PSAP. When this requirement exists, the LRF may store a record of the emergency session including all information provided by the E-CSCF and shall only release this record when informed by the E-CSCF that the emergency session has terminated. The information provided by the LRF to the E-CSCF (e.g. ESQK) can then include correlation information identifying both the LRF and the emergency session record in the LRF. This correlation information can be transferred to the PSAP during session establishment (e.g. in a SIP INVITE or via SS7 ISUP signalling from the MGCF). The PSAP may use this information to request an initial location estimate from the LRF and/or to request an updated location estimate.

A Uniform Resource Name (URN) is a Uniform Resource Identifier (URI) that uses the urn scheme, and does not imply availability of the identified resource. The Functional Requirements for Uniform Resource Names are described in IETF RFC 1737.

Basic system architecture of a communication network may comprise a commonly known architecture of a wired or wireless access network subsystem. Such an architecture comprises one or more access network control units, radio access network elements, access service network gateways or base transceiver stations, with which a user equipment is capable to communicate via one or more channels for transmitting several types of data. The general functions and interconnections of these elements are known to those skilled in the art and described in corresponding specifications so that a detailed description thereof is omitted herein. However, it is to be noted that there are provided several additional network elements and signaling links used for a communication connection or a call between user terminals and/or servers than those described in detail herein below.

Furthermore, the network elements and their functions described herein may be implemented by software, e.g. by a computer program product for a computer, or by hardware. In any case, for executing their respective functions, correspondingly used devices, such as an interworking node or network control element, like an P-CSCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Sometimes involvement of an application server (AS) may belong to establishment of an emergency session. For example, an emergency session may be initiated by an AS (e.g. click-to-call) of behalf of UE, or one or more ASs must be triggered by the S-CSCF, e.g. Virtual Private Network (VPN) AS to remove the VPN prefix, or to send pre-establishment announcements and call failure announcements to the UE.

IMS utilizes home service model, while emergency service is the service of the visited network. According to currently specified procedures for the IMS emergency architecture application servers are not involved in emergency request handling (FIG. 1). However there are use cases when services requiring an AS could be involved in emergency request, such as, calls initiated on behalf of the user, calls initiated in private network (VPN) and network provides hosted services for private network users (e.g. removing dialling prefix, generating announcements for users with dummy phones). In these cases further services may have to be involved in emergency request.

According to the invention, a new emergency related local service functionality (ERLSF) is implemented. The ERLSF functionality has interface to E-CSCF and can be considered as an application server for emergency request. Services that are necessary to handle IMS emergency calls can implement the ERLSF functionality as part of the service, for example an EATF (E-SCC AS) and an AS that is serving VPN to provide announcement for failure cases when UEs in private networks can not provide indication for the reason of emergency request failure. Also a click-to-dial server can implement emergency related local service functionality.

Figure 2A:
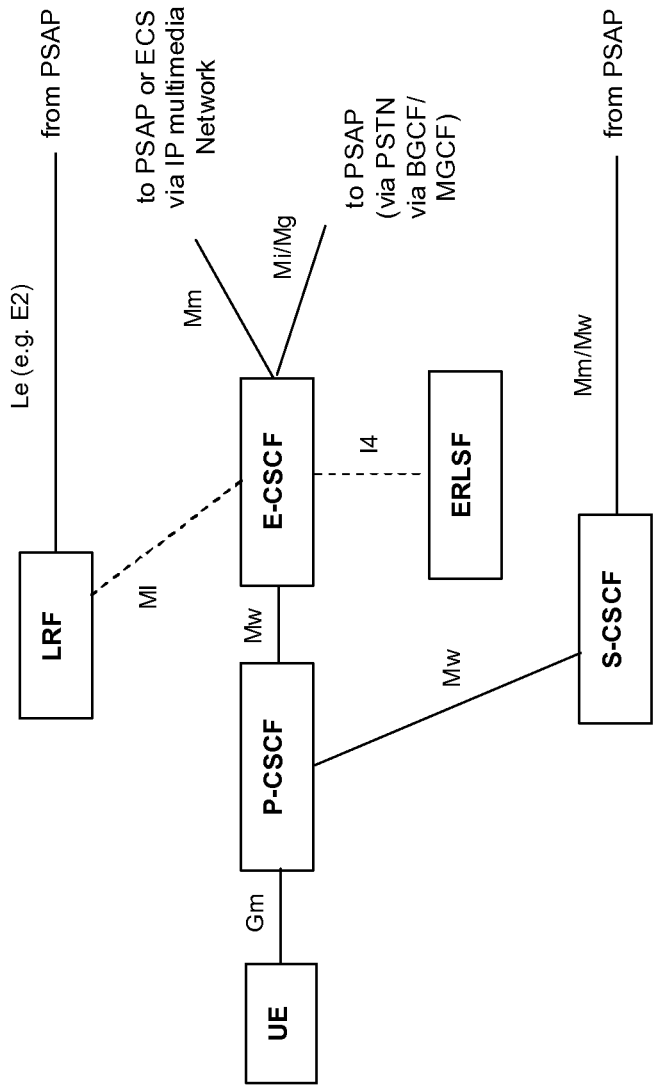
Figure 2B:
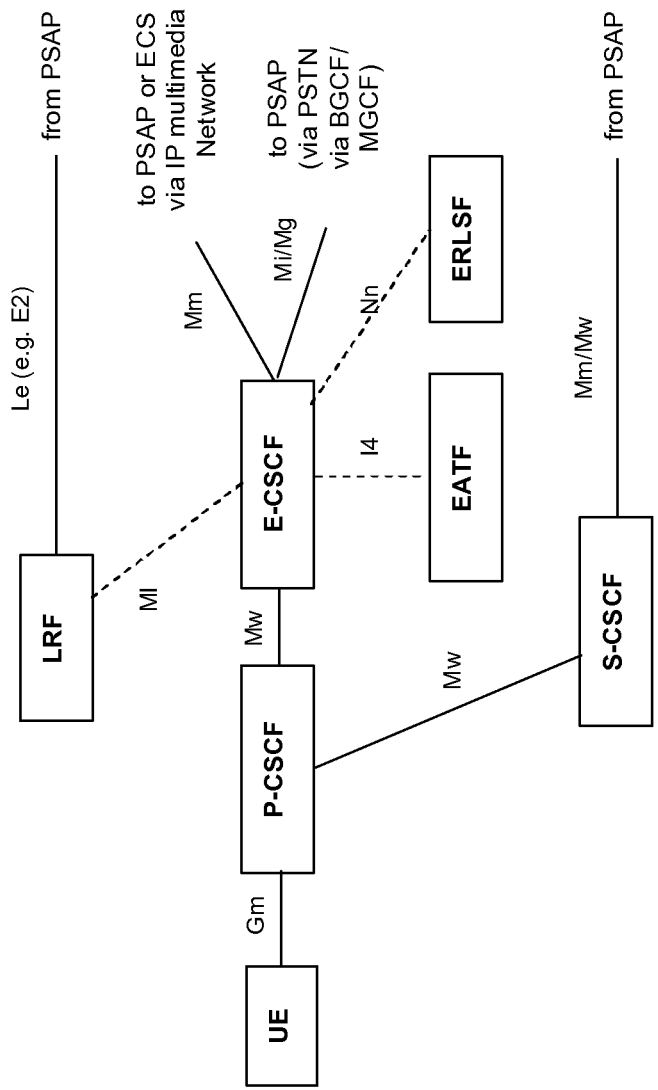

According to one aspect of the invention, the ERLSF functionality can be introduced with existing I4 interface by connecting the ERLSF functionality to an E-CSCF (FIG. 2a), or over a new interface (FIG. 2b);

According to one aspect of the invention, implementation of services like click-to-dial are made emergency-aware and connected directly to E-CSCF when an emergency session is detected. Further, and E-CSCF can be extended to invoke services, like playing announcements for private network users if the emergency request is rejected. As an example, the service can be implemented in VPN AS as a service of the visited network.

According to one aspect of the invention, emergency related local service functionality can be invoked by an E-CSCF using a mechanism similar to AS triggering in the S-CSCF is used, however the invoking may be subscriber independent, meaning that instead of applying filter criteria, the service invocation can be hardcoded for all subscribers.

According to one aspect of the invention, if emergency related local service functionality initiates an emergency request, it can be sent to an E-CSCF and if necessary the E-CSCF may invoke further emergency related local service functionalities for the same emergency request.

In click-to-dial service an application establishes a session between a calling user and a called user. The called user may also be an application or an emergency center (PSAP). For example, a calling user may be surfing in the internet and click a "click-to-dial" button on a website which can initiate the application hosting the website to establish a session between the calling user and a called user. The address of the called user may be pre-configured and associated with the "click-to-dial" button or may be for example, given by the calling user before or after clicking the button.

A click-to-dial service creates two call legs: the "server to served/calling user" call leg (shown with line 3 in FIGS. 3, 4 and 5) which can be routed through an S-CSCF, however this call leg is not considered as an emergency call.

Figure 5:
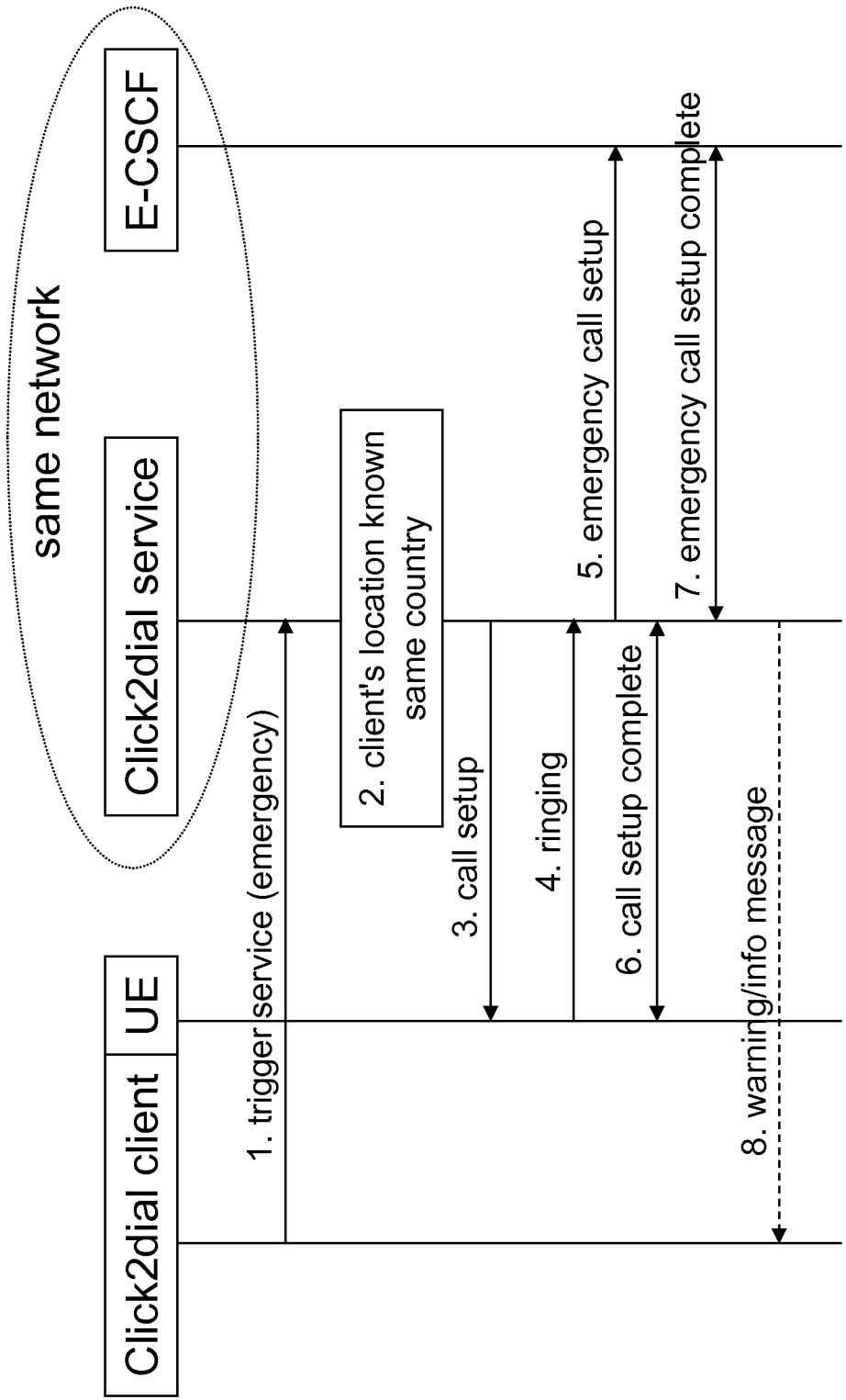

The second call leg established by the application logic is "server to called user" (FIG. 3, line 6. FIG. 5, line 5). Even if the "called user" may be an emergency center (PSAP), the core network may not know that the "server to served/calling user" call leg is linked to an emergency related call leg.

According to an aspect of the invention, click-to-dial service is emergency-aware. The click-to-dial service can check whether a call attempt at the current location of the served/calling user can be considered as an emergency call and/or whether that request can be served. Checking whether the request can be served can mean checking if the served/calling user is in the same country, region or network as the click-to-dial server.

According to an aspect of the invention, when a click-to-dial server sets up a call leg towards a called user and the request has been determined to comprise an request for an emergency service, the request is not send towards the S-CSCF (possibly via I-CSCF), but instead an emergency service request is transmitted to an element providing emergency services locally, for example to, an E-CSCF in the same network.

The core network may be unaware of involvement of the application server in the session establishment.

Figure 6:
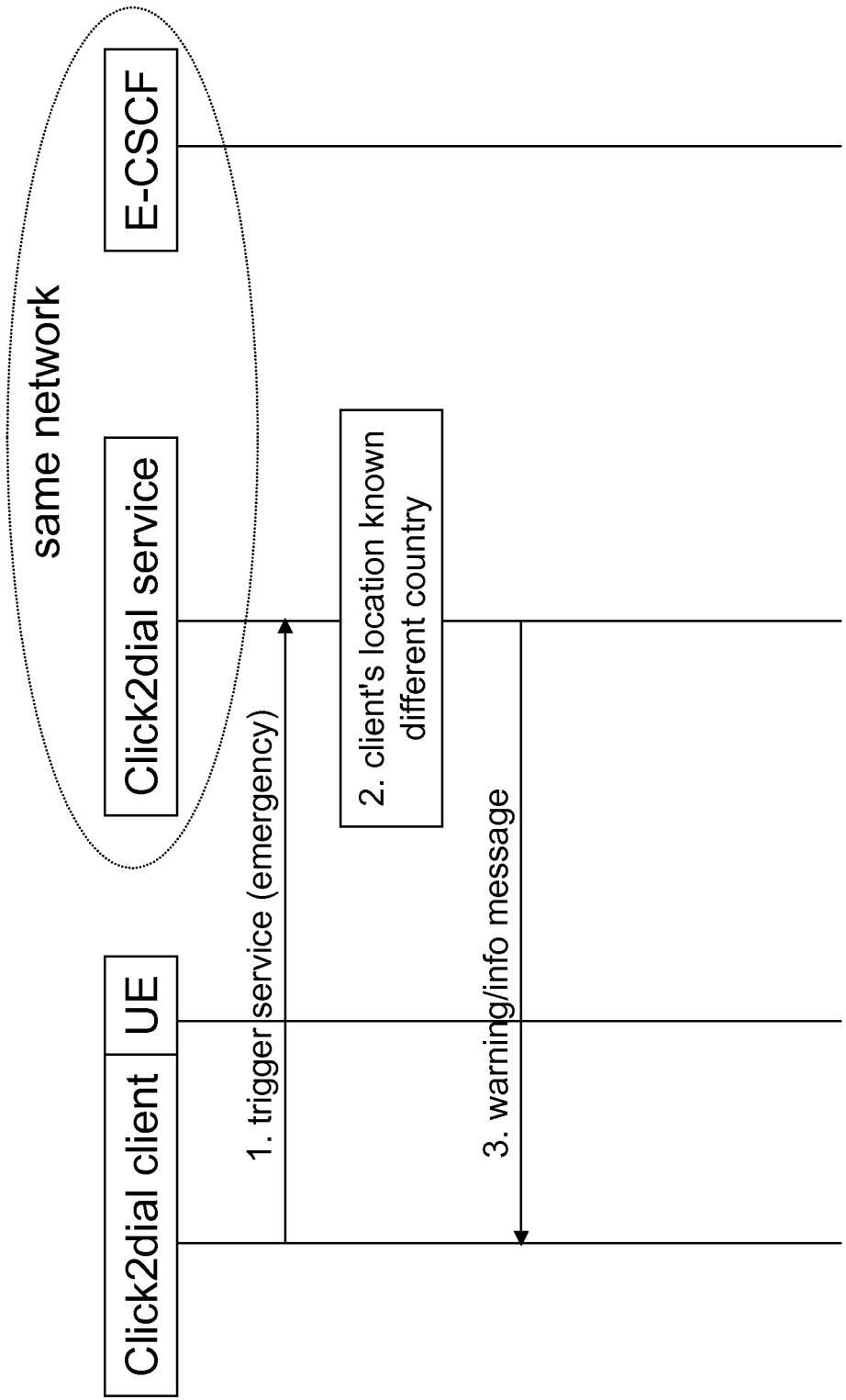

According to an aspect of the invention, when a click-to-dial server receives a request (e.g. http connection) to set up a call (signal 1 on FIGS. 3 to 6), the click-to-dial server can check if the location of the client/user is known (step 2 on FIGS. 3 to 6). If the location is known, the click-to-dial server can check if the requested number/identity is for an emergency service. If the client/user location is in a different country, and the request is a request for an emergency session, the click-to-dial server can reject the request and can inform the user that the click-to-dial server cannot serve the emergency request, as the click-to-dial server is in an another country (FIG. 6).

According to an aspect of the invention, if the client/user location is in the same country (FIG. 5), the click-to-dial server can set up a call leg towards the client/user (FIG. 5, signal 3), as well as towards the emergency center via the E-CSCF. FIG. 5 shows ringing as the trigger to initiate the call leg towards the emergency center, however other triggers can be used as well depending on the implementation of the click-to-dial service.

Figure 4:
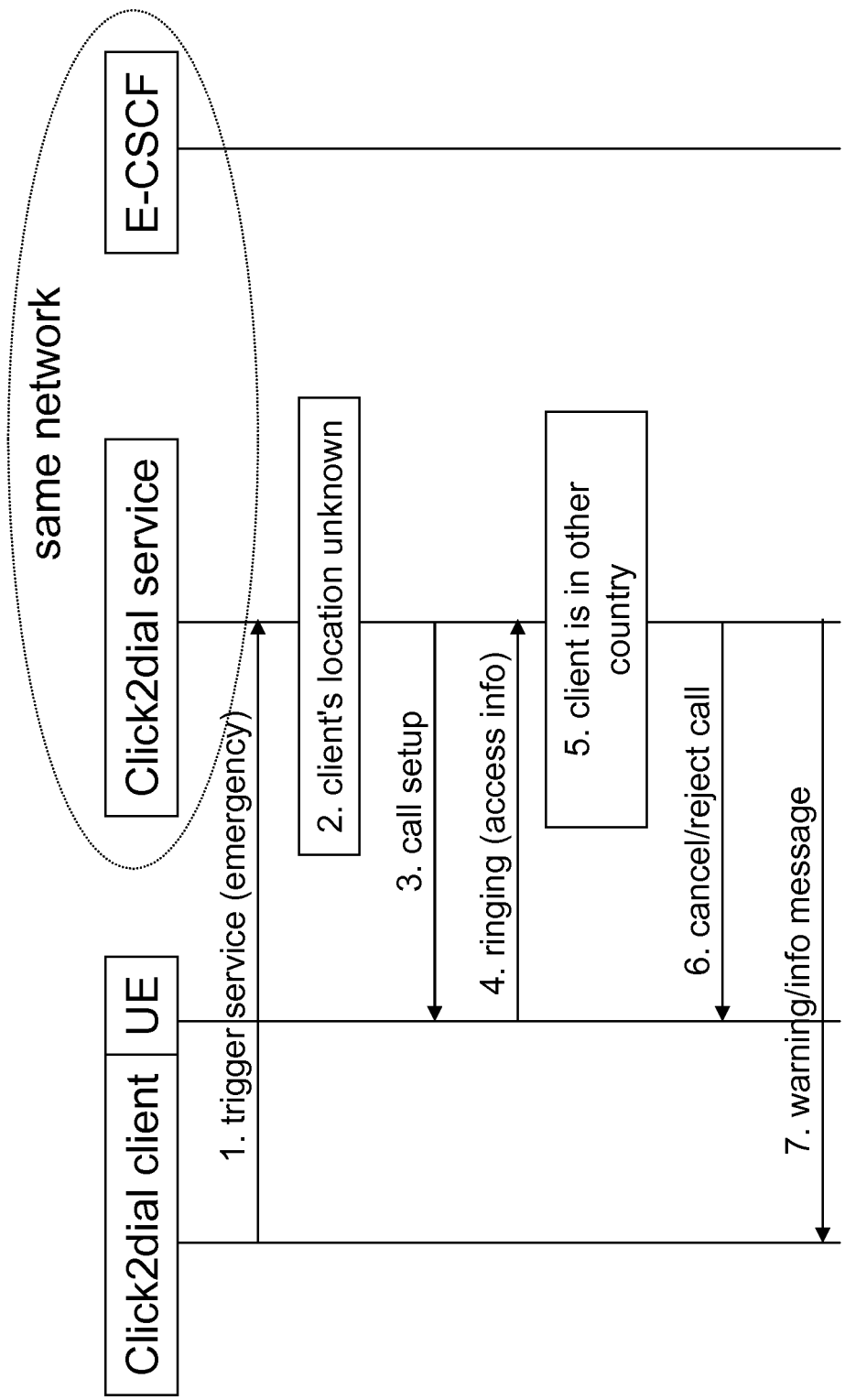

According to an aspect of the invention, if the location of the client/user is not known, then the click-to-dial server can initiate call setup towards the client/served user (step 3 on FIGS. 3 and 4). The first provisional response can include the access information of the client/served user which may disclose more information about the location of the client/served user. If the client/user location is in a different country, and the request for emergency (as shown on FIG. 4), the click-to-dial server can terminate the call leg towards the client/served user and can inform the user that click-to-dial server cannot serve the emergency request, as the click-to-dial server is in an another country. If the client/user location is determined to be in the same country (as FIG. 3), the click-to-dial server can set up a call leg towards the emergency center (via the E-CSCF).

Figure 7:
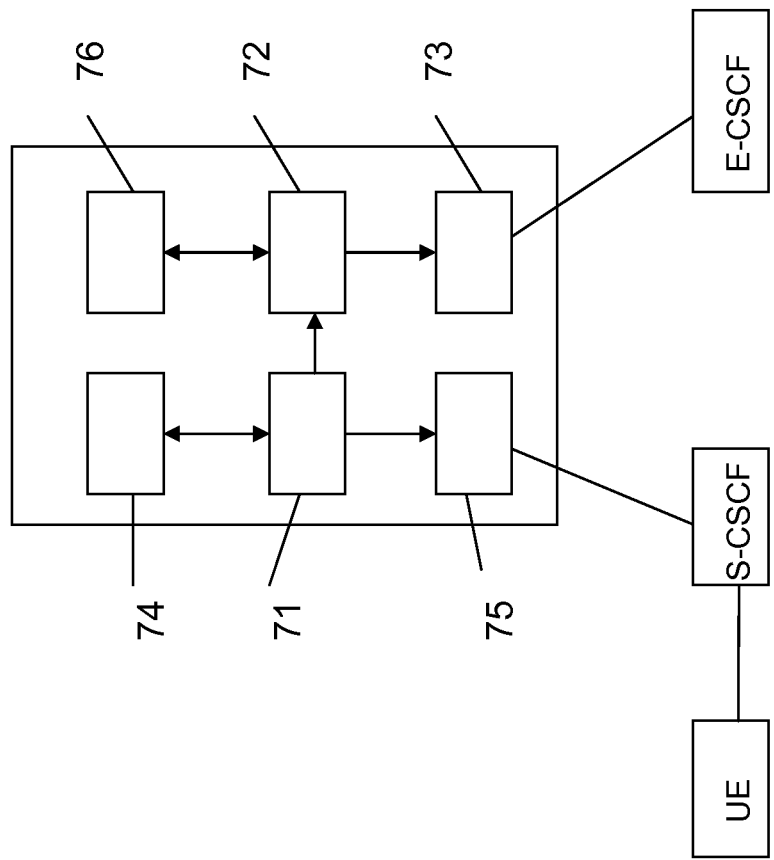
FIG. 7 illustrate internal structure and functions of an apparatus implementing aspects of the invention.

FIG. 7 illustrates internal structure and functions of an apparatus implementing aspects of the invention. An application server (AS) can comprise an establishing unit 71 configured to establish a request for a session, for example according to SIP. A determining unit 72 can be configured to determine if the session comprises an emergency service. A transmitting unit 73 can be configured to transmit the request for the session to an emergency call state control function (E-CSCF) of the internet protocol multimedia subsystem (IMS) if it is determined by the determining unit 72 that the session is an emergency service.

The application server (AS) can have a service unit 74 configured to implement a click-to-dial service, which can enable a served user to establish a session with help of the application server. The application server (AS) can have a checking unit 76 configured to check after determining that the session comprises an emergency session, whether the emergency session can be provided to a served user based on location and or access related information associated with the served user, for example by checking whether the served user is located in a different country than the application server.

The application server (AS) can have a transmitting unit 75 configured to transmit a request to establish a call leg towards the served user, for example according to SIP, and the checking unit 76 can be configured to retrieve access related information (e.g. P-Access-Info header) of the served user from a response received to the request to establish the call leg towards the served user sent by the transmitting unit 75.

All units described above may be implemented for example using microprocessors, chips and/or other electrical components and/or by software.

An apparatus, such as a AS or E-CSCF, may be physically implemented in a switch, router, server or other hardware platform or electronic equipment which can support data transmission and processing tasks, or can be implemented as a component of other existing device.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The invention is not limited to handling of emergency sessions in the IMS network(s), but may also be applied in other type of networks having similar kind of emergency services. Functions of the session control entity implementing aspects of the inventions and described above may be implemented by code means, as software, and loaded into memory of a computer.

The invention claimed is:

1. A method comprising:
   establishing a request for a session on behalf of a user by an application server, wherein the application server is configured to implement a click-to-dial service;
   determining by an emergency related local service function that the session comprises an emergency session, wherein the emergency related local service function is co-located at the application server;
   transmitting the request for the session to an emergency call state control function of the internet protocol multimedia subsystem based on the determining; and
   transmitting, by the click-to-dial service, a request to establish a call leg towards the user,
   wherein the method is for handling an emergency service in an internet protocol multimedia subsystem network.

2. The method of claim 1, further comprising:
   checking, after determining that the session comprises an emergency session, whether the emergency session can be provided to the user based on location information of the user.

3. The method of claim 2, wherein checking comprises checking whether, based on the location information, the user is located in a different country than the application server.

4. The method of claim 2, wherein the checking comprises retrieving access related information of the user from a response received to the request to establish the call leg towards the user.

5. A computer program product comprising a non-transitory computer-readable storage medium bearing computer program code embodied therein for execution by a computer, the computer program code comprising code for performing the method according to claim 1.

6. An apparatus comprising:
   one or more processors; and
   one or more memories including computer program code, the one or more memories and the computer program code, when executed by the one or more processors, causing the apparatus to perform:
   implementing a click-to-dial service for establishing a request for a session on behalf of a user;
   determining by an emergency related local service function that the session comprises an emergency session;
   transmitting the request for the session to an emergency call state control function of the internet protocol multimedia subsystem based on the determining; and
   transmitting, by the click-to-dial service, a request to establish a call leg towards the user.

7. The apparatus of claim 6, wherein the one or more memories and the computer program code, when executed by the one or more processors, further cause the apparatus to perform:
   checking, after determining that the session comprises an emergency session, whether the emergency session can be provided to the user based on location information of the user.

8. The apparatus of claim 7, wherein the checking comprises checking whether, based on the location information, the user is located in a different country from the application server.

9. The apparatus of claim 7, wherein
   the checking comprises retrieving access related information of the user from a response received to the request to establish the call leg towards the user.

* * * * *